(12) United States Patent
Sakai

(10) Patent No.: US 12,153,842 B2
(45) Date of Patent: Nov. 26, 2024

(54) PRINTING DEVICE, NON-TRANSITORY COMPUTER-READABLE STORAGE MEDIUM STORING PROGRAM, AND PRINTING METHOD

(71) Applicant: SEIKO EPSON CORPORATION, Tokyo (JP)

(72) Inventor: Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/475,334

(22) Filed: Sep. 27, 2023

(65) Prior Publication Data

US 2024/0111468 A1 Apr. 4, 2024

(30) Foreign Application Priority Data

Sep. 29, 2022 (JP) ................ 2022-156438

(51) Int. Cl.
*G06F 3/12* (2006.01)

(52) U.S. Cl.
CPC .......... *G06F 3/1263* (2013.01); *G06F 3/1204* (2013.01); *G06F 3/1253* (2013.01)

(58) Field of Classification Search
CPC ..... G06F 3/1263; G06F 3/1204; G06F 3/1253
See application file for complete search history.

(56) References Cited

U.S. PATENT DOCUMENTS

| | | | |
|---|---|---|---|
| 2018/0210685 A1* | 7/2018 | Kubota | G06F 3/1212 |
| 2019/0095152 A1* | 3/2019 | Kaneko | G06F 3/1238 |
| 2019/0303080 A1* | 10/2019 | Mukai | G06F 21/608 |
| 2020/0250125 A1* | 8/2020 | Yoshihara | G06F 13/4221 |
| 2020/0272389 A1* | 8/2020 | Truong | G06F 3/1298 |
| 2020/0387333 A1* | 12/2020 | Nakajima | G06F 3/1222 |
| 2021/0089245 A1* | 3/2021 | Chiba | G06F 3/1204 |
| 2021/0089247 A1* | 3/2021 | Nakajima | G06F 3/126 |

FOREIGN PATENT DOCUMENTS

JP 2021-097258 A 6/2021

* cited by examiner

*Primary Examiner* — Iriana Cruz

(74) *Attorney, Agent, or Firm* — Global IP Counselors, LLP

(57) ABSTRACT

A printing device including a display section that displays a first button that switches a screen to a setting screen via which a setting of printing is received and a second button that causes printing to be immediately executed in accordance with a preset setting and a job management section that adds a first job printing of which is instructed after the first button is pressed and the screen is switched to the setting screen to a subsequent order and adds a second job printing of which is instructed from the second button to a preceding order.

7 Claims, 5 Drawing Sheets

US 12,153,842 B2

PRINTING DEVICE, NON-TRANSITORY COMPUTER-READABLE STORAGE MEDIUM STORING PROGRAM, AND PRINTING METHOD

The present application is based on, and claims priority from JP Application Serial Number 2022-156438, filed Sep. 29, 2022, the disclosure of which is hereby incorporated by reference herein in its entirety.

BACKGROUND

1. Technical Field

The present disclosure relates to a printing device, a non-transitory computer-readable storage medium storing a program, and a method for producing a printed material.

2. Related Art

Immediate execution buttons that allow immediate execution of a function have been known. For example, JP-A-2021-097258 discloses an immediate execution button displayed on a function display screen of a printing device or the like and used for immediately executing a job in accordance with selection and instruction of a user.

However, in JP-A-2021-097258, a processing order of printing jobs executed via an immediate execution button is not considered. Therefore, according to JP-A-2021-097258, a printing job corresponding to an immediate execution button can be executed after a printing job waiting to be processed, so that the printing job corresponding to the immediate execution button cannot be immediately processed in some cases.

SUMMARY

According to an aspect to solve the above-described problem, provided is a printing device including a display section that displays a first button that switches a screen to a setting screen via which a setting of printing is received and a second button that causes printing to be immediately executed in accordance with a preset setting, an accumulation section that accumulates a printing job, and a job management section that manages the printing job accumulated by the accumulation section, and the job management section adds a first job printing of which is instructed after the first button is pressed and the screen is switched to the setting screen to an order after the printing job accumulated by the accumulation section and adds a second job printing of which is instructed from the second button to an order before the printing job accumulated by the accumulation section.

According to another aspect to solve the above-described problem, provided is a non-transitory computer-readable storage medium storing a program, the program causing a processor of a printing device including a display section that displays a first button that switches a screen to a setting screen via which a setting of printing is received and a second button that causes printing to be immediately executed in accordance with a preset setting, and an accumulation section that accumulates a printing job to function as a job management section that manages the printing job accumulated by the accumulation section, and the job management section adds a first job printing of which is instructed after the first button is pressed and the screen is switched to the setting screen to an order after the printing job accumulated by the accumulation section and adds a second job printing of which is instructed from the second button to an order before the printing job accumulated by the accumulation section.

According to still another aspect to solve the above-described problem, provided is a method for producing a printed material by a printing device, the method including displaying a first button that switches a screen to a setting screen via which a setting of printing is received and a second button that causes printing to be immediately executed in accordance with a preset setting, adding a first job printing of which is instructed after the first button is pressed and the screen is switched to the setting screen to an order after an accumulated printing job, adding a second job printing of which is instructed from the second button to an order before the accumulated printing job, and printing the accumulated printing job, the first job, and the second job in a processing order to produce a printed material.

DESCRIPTION OF EMBODIMENTS

First Embodiment

Embodiments will be described below with reference to the accompanying drawings.

Figure 1:
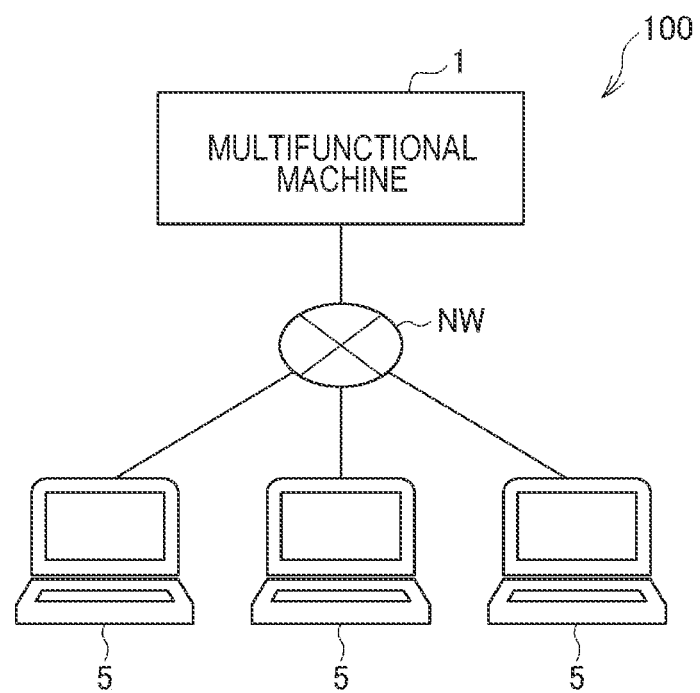
FIG. 1 is a diagram illustrating a configuration of a printing system.

FIG. 1 is a diagram illustrating a configuration of a printing system 100 including a multifunctional machine 1 according to an embodiment. The printing system 100 includes the multifunctional machine 1 having a printing function, a copy function, a facsimile function, a scanning function, or the like and an external information processing device 5 coupled to the multifunctional machine 1 via a wired or wireless network NW. A device operator of the multifunctional machine 1 instructs printing from the external information processing device 5 in some cases and directly goes near the multifunctional machine 1 and operates the multifunctional machine 1 in other cases.

The multifunctional machine 1 is an example of a "printing device."

Figure 2:
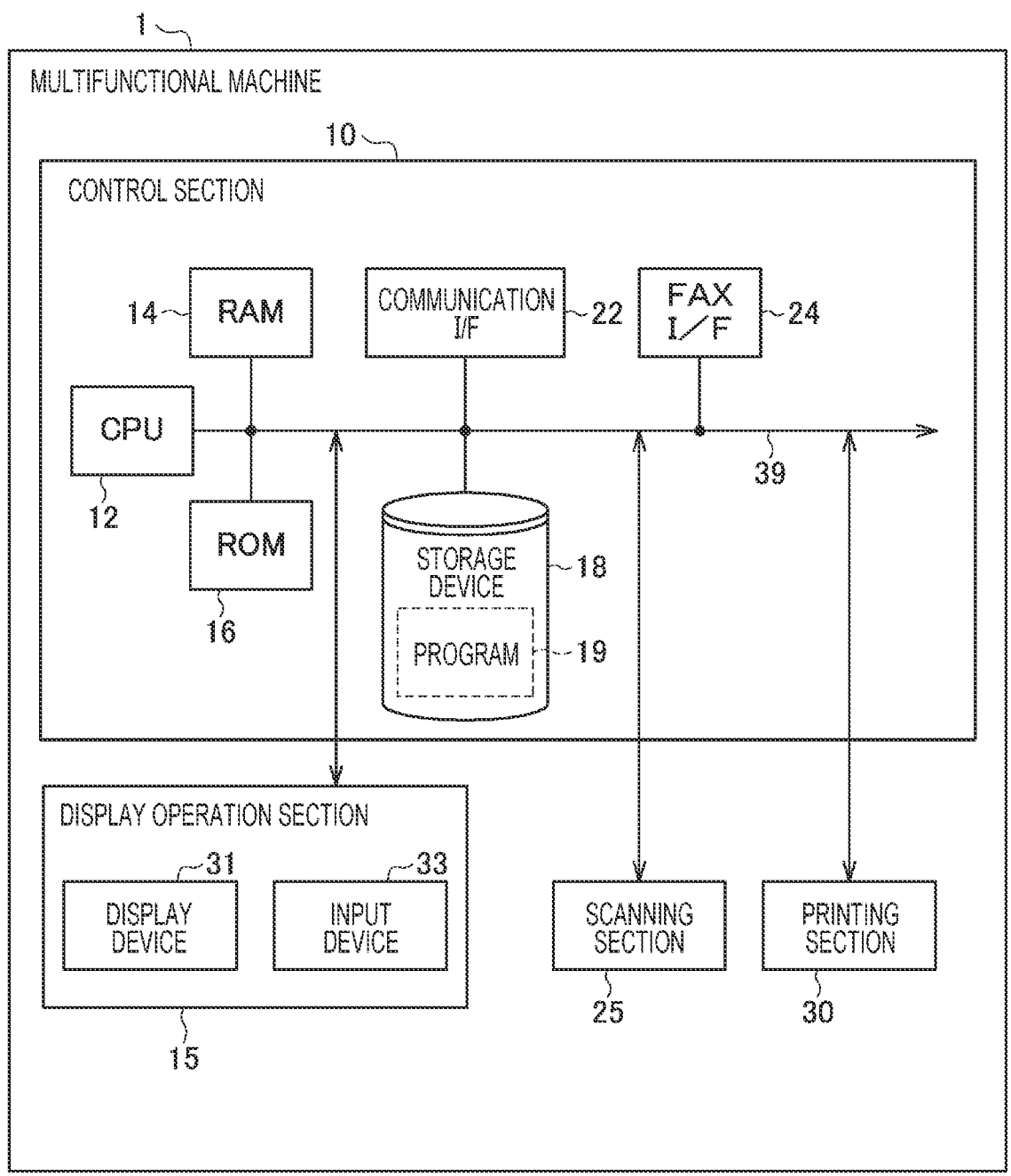
FIG. 2 is a diagram illustrating a configuration of a multifunctional machine.

FIG. 2 is a diagram illustrating a configuration of the multifunctional machine 1. The multifunctional machine 1 includes a control section 10 that performs control of an entire device. The multifunctional machine 1 includes a display operation section 15 including a display and an operation section that are used for operating the multifunctional machine 1 by the device operator. The multifunctional machine 1 further includes a scanning section 25. The multifunctional machine 1 still further includes a printing section 30.

The control section 10 is an information processing device including a processor, such as a central processing unit (CPU) 12 or the like, that performs various arithmetic operations, a random access memory (RAM) 14, and a read only memory (ROM) 16. The control section 10 includes a storage device 18, executes various programs stored in the storage device 18 to operate as a display section 40, a job management section 45, an input section, or the like, and thus realizes various functions. The control section 10 includes a communication I/F 22. The communication I/F 22 includes an interface circuit that transmits and receives information, for example, to and from the external information processing device 5 via a wireless or wired communication device. The control section 10 includes a facsimile I/F 24. The facsimile I/F 24 includes an interface circuit that couples to a telephone line. The storage device 18 accumulates a printing job in a processing order. Herein, the printing job includes a control command and image data.

The RAM 14 and the storage device 18 are examples of an "accumulation section."

The storage device 18 may be a device that stores various types of information, such as various programs, job data, other setting information, or the like, may be a hard disk drive (HDD), may be a solid state drive (SSD), and may be a memory. In this embodiment, the storage device 18 is installed inside the multifunctional machine 1, but may be stored in an external device, that is, for example, a device on a cloud.

A display device 31 in the display operation section 15 is a device that can visually display various types of information in accordance with an instruction of the CPU 12 that operates as the display section 40, and is, for example, a liquid crystal panel display. An input device 33 is a device that transmits an operation by a user to the CPU 12 that operates as the input section and is, for example, a touch sensor provided on a surface of the display device 31. However, the input device 33 may be a mechanical key provided separately from the display device 31 and may be a mouse. Display may include, in addition to presentation of visual information, presentation of audio information. A projector that visually displays various types of information on a screen may be the display device.

The scanning section 25 scans an original document placed on an original document stand and accumulates the original document as image information in the storage device 18. The scanning section 25 includes the original document stand, a light source, and a detection section. The scanning section 25 applies light generated by the light source to a reading object, reads a character or an image, and accumulates image data obtained by reading in the storage device 18. The accumulated image data is printed by the printing section 30 that will be described later. The image data may be transmitted to the external information processing device 5 that has been preset.

The printing section 30 has a configuration in which an image is printed on a printing medium in accordance with an existing method, such as an ink jet method, an electrophotographic method, or the like. For example, when the ink jet method is employed, the printing section 30 includes an ink jet head that discharges ink to a printing medium to form dots, a carriage that causes the ink jet head to scan in a scanning direction, and a carriage drive motor that drives the carriage. The printing section 30 includes a component, such as a transport unit that transports the printing medium, an ink supply unit that supplies ink to the ink jet head, or the like, related to printing.

Various devices of the control section 10, the display operation section 15, the scanning section 25, and the printing section 30 are coupled to a bus 39 to exhibit respective functions thereof.

Figure 3:
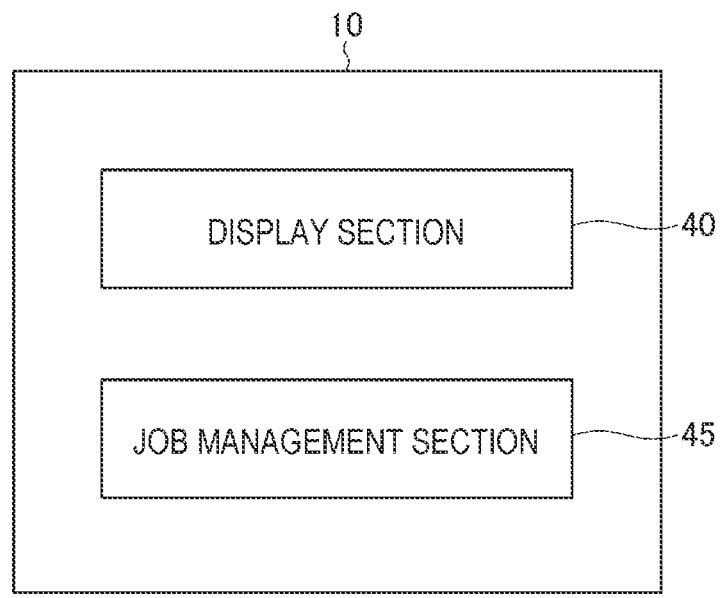
FIG. 3 is a functional block diagram of a control section.

FIG. 3 is a functional block diagram of the control section 10. The control section 10 performs processing instructed by the device operator by executing the program 19 stored in the storage device 18 by the CPU 12. Specifically, for example, in accordance with a printing job transmitted from the external information processing device 5, the control section 10 performs processing of printing or the like.

The control section 10 functions as the display section 40 and the job management section 45 by reading and executing the program 19 by the CPU 12. The display section 40 performs control of the display device 31 to cause the display device 31 to display information. The display section 40 of this embodiment causes the display device 31 to display an operation screen 60. The control section 10 also functions as the job management section 45. The job management section 45 controls processing of a printing job, that is, scanning in the scanning section 25, printing in the printing section 30, or the like.

Figure 4:
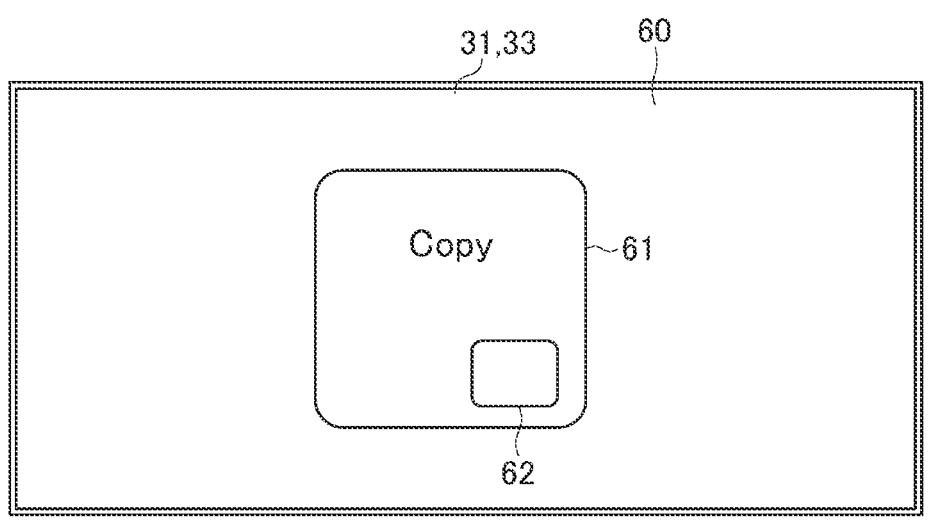
FIG. 4 is a diagram illustrating an example of an operation screen.

The operation screen 60 will be described below with reference to FIG. 4. FIG. 4 is a diagram illustrating an example of the operation screen 60. The operation screen 60 includes a first button 61 and a second button 62, but may also include some other button.

The first button 61 is a software button used for performing scanning and producing a printed material on which a character or an image read by scanning is printed. That is, the first button 61 is a button used for copying. A display control section 35 switches the operation screen 60 to a setting screen of scanning and printing to display the setting screen, when the first button 61 is pressed. Color or monochrome setting, resolution setting, setting on whether an automatic document feeding mechanism or a flatbed is used, or the like can be performed via the setting screen. The setting screen includes a print start button and, when the print start button is pressed, the job management section 45 that will be described later performs scanning in accordance with contents set via the setting screen. Then, the job management section 45 that will be described later prints a character or an image obtained by scanning on a printing medium in accordance with the contents set via the setting screen to produce a printed material.

The second button 62 is a software button. In this embodiment, an example in which the second button 62 is superimposed on the first button 61 and is thus displayed is illustrated, but the second button 62 is not limited thereto. The second button 62 is an immediate execution button. That is, the second button 62 is a button used for immediately executing copying without displaying the setting screen of scanning and printing. When the second button 62 is pressed, the display section 40 does not display the setting screen, and the job management section 45 that will be described later performs scanning by the scanning section 25 and prints a character or an image obtained by scanning on a printing medium to produce a printed material. Note that setting of scan resolution, print resolution, or the like is associated with the second button 62 in advance by an administrator using the setting screen. Note that, herein, "immediately" executing copying is not limited to reading an original document at a moment when the first button is pressed. In a case where, when the second button 62 is pressed, copying is executed even without any operation performed by a user after the second button 62 has been pressed, it is assumed herein that copying is "immediately" executed. In this case, even when warm-up is started after the second button 62 has been pressed and scanning is started after the warm-up is completed, it is also assumed herein that copying is "immediately" executed. Also, in a case where, when the second button 62 is pressed, copying is started without switching to the setting screen, it is assumed herein that copying is "immediately" executed.

Returning to the description of the control section 10 of FIG. 3, the job management section 45 performs scanning by the scanning section 25. The job management section 45 performs printing by the printing section 30. The job management section 45 processes printing jobs accumulated in the storage device 18 in a processing order. The job management section 45 manages a printing job transmitted from the external information processing device 5 coupled thereto via the network NW and a printing job directly instructed via the display operation section 15.

The job management section 45 adds a printing job to the storage device 18.

The job management section 45 adds a printing job printing of which is instructed after the first button 61 has been pressed and the operation screen 60 has been switched to the setting screen after the printing jobs accumulated by the storage device 18. Herein, it is meant by adding a printing job after the accumulated printing jobs that the printing job is added such that a processing order thereof comes after those of the accumulated printing jobs. In this embodiment, it is meant by adding a printing job after the accumulated printing jobs that a printing job is added after all the printing jobs accumulated by the storage device 18, that is, a printing job is added such that a processing order of the printing job is last. Note that adding a printing job after the accumulated printing jobs is not limited to adding a printing job such that a processing order of the printing job is last and may be adding a printing job such that a processing order of the printing job is after that of a printing job corresponding to a predetermined condition.

The job management section 45 adds a printing job printing of which is instructed from the second button 62 before the printing jobs accumulated by the storage device 18. Herein, it is meant by adding a printing job before the accumulated printing jobs that a printing job is added such that a processing order thereof is before those of the accumulated printing jobs. In this embodiment, it is meant by adding a printing job before the accumulated printing jobs that a printing job is added before all the printing jobs accumulated by the storage device 18, that is, a printing job is added such that a processing order of the printing job is first. Note that adding a printing job before the accumulated printing jobs is not limited to adding a printing job such that a processing order of the printing job is first and may be adding a printing job such that a processing order of the printing job is before that of a printing job corresponding to a predetermined condition.

Figure 5:
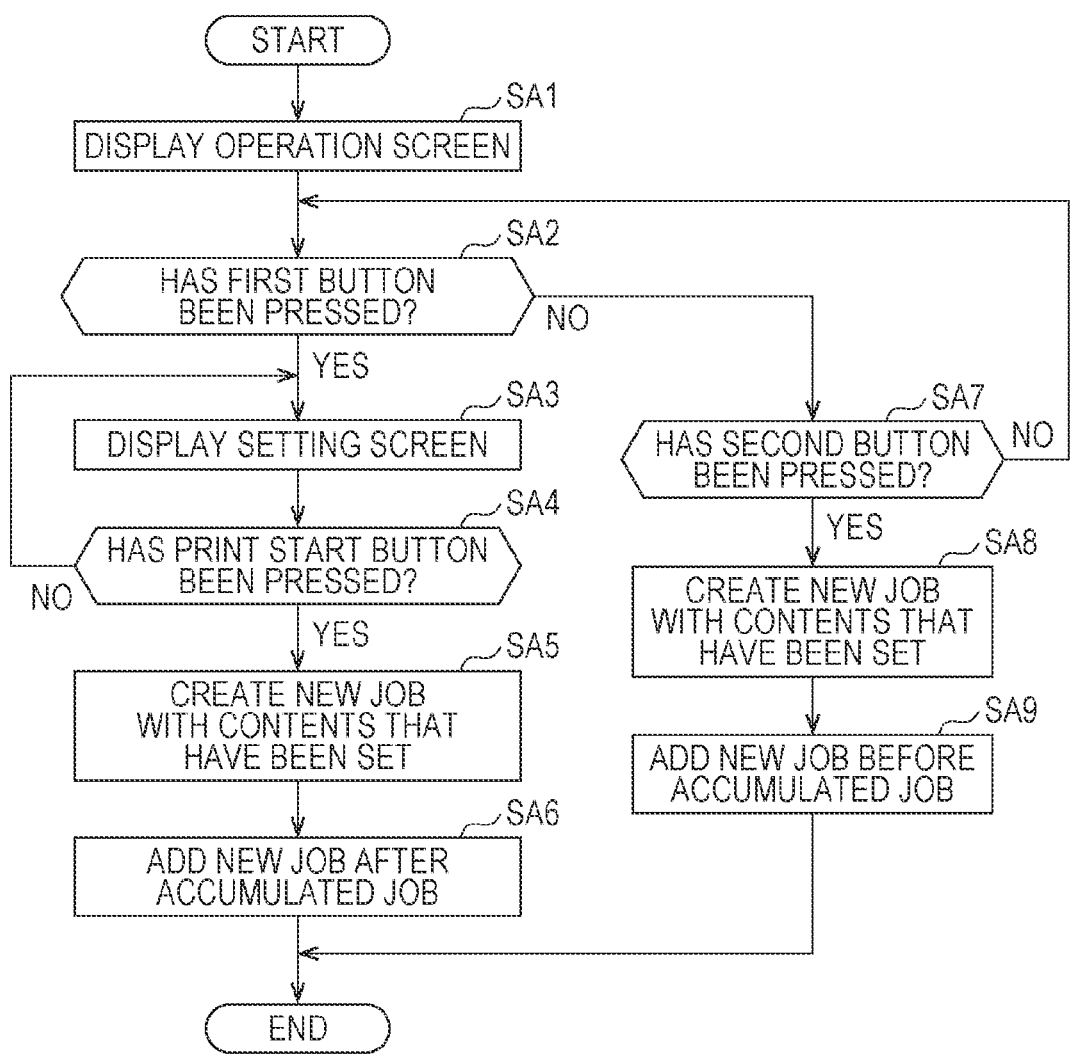
FIG. 5 is a flowchart illustrating an operation of a printing device.

FIG. 5 is a flowchart illustrating an operation of the multifunctional machine 1. In the flowchart, a case where only a printing job is executed is illustrated, but a job of some other function, that is, for example, an image scanning function, a copying function, a facsimile function, or the like may be included in a mixed manner.

In the multifunctional machine 1, the display section 40 displays the operation screen 60 on the display device 31 (Step SA1). The display section 40 determines whether the first button 61 in the input device 33 has been pressed (Step SA2). When it is determined that the first button 61 has been pressed (Step SA2: YES), the display section 40 causes the display device 31 to display a print setting screen (Step SA3). Upon receiving change of setting or the like, the job management section 45 processes the setting change or the like. The display section 40 determines whether the print start button provided on the print setting screen has been pressed (Step SA4). When it is determined that the print start button has been pressed (Step SA4: YES), the job management section 45 creates a new printing job with contents that have been set (Step SA5). The job management section 45 adds the new printing job to the accumulated printing jobs such that a processing order of the printing job is last (Step SA6).

When it is determined that the print start button has not been pressed (Step SA4: NO), the process returns to Step SA3.

When it is determined that the first button 61 has not been pressed (Step SA2: NO), the display section 40 determines whether the second button 62 in the input device 33 has been pressed (Step SA7). When it is determined that the second button 62 has been pressed (Step SA7: YES), the job management section 45 creates a new printing job (Step SA8). Next, the job management section 45 adds the new printing job to the accumulated printing jobs such that a processing order of the new printing job is first (Step SA9).

When it is determined that the second button 62 has not been pressed (Step SA7: NO), the process returns to Step SA2.

Second Embodiment

A configuration of the multifunctional machine 1 according to a second embodiment is similar to that of the first embodiment, and therefore, description thereof will be omitted.

Figure 6:
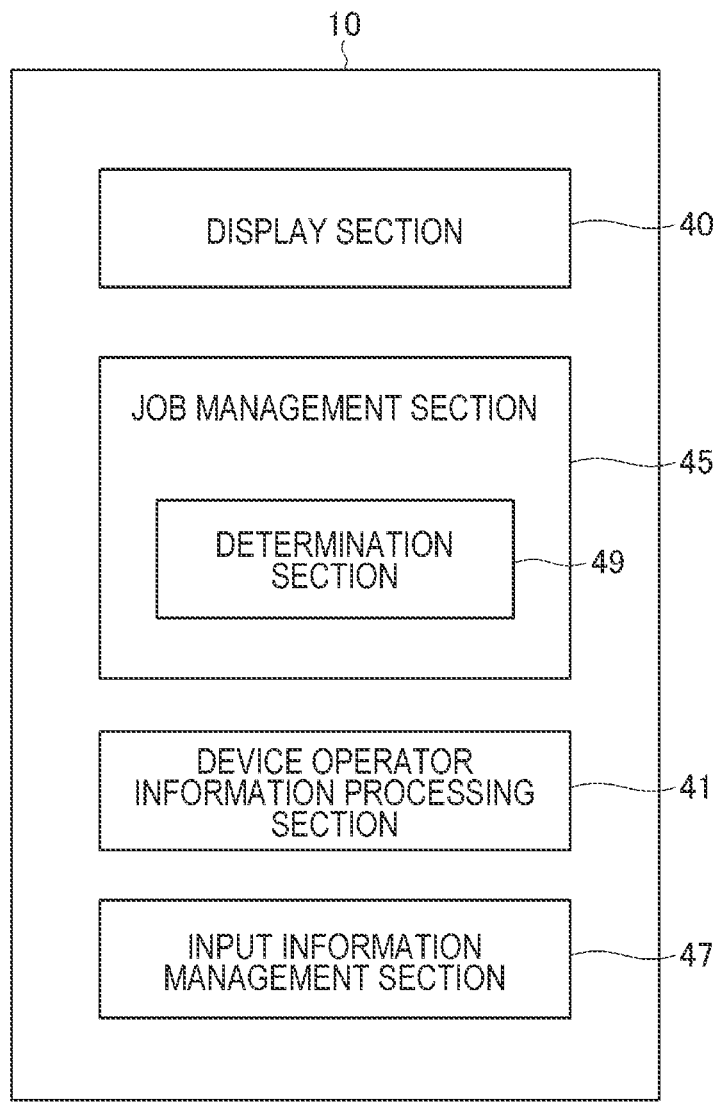
FIG. 6 is a functional block diagram of the control section.

FIG. 6 is a functional block diagram of the control section 10 in the multifunctional machine 1 according to the second embodiment. The control section 10 further includes a device operator information processing section 41 that processes information of a device operator. As used herein, the term "device operator" refers to a person who is physically present close to the multifunctional machine 1 and performs an operation directly using the input device 33.

An input information management section 47 reflects setting that has been input from the input device 33 to processing. In the input information management section 47, for example, a function of managing a card reader that reads an authority of the device operator from an ID card of the device operator is realized. The device operator information processing section 41 performs compares an authority of an instructor who instructed an accumulated printing job with the authority of the device operator and performs determination. As used herein, the term "authority" refers to a priority order of processing that has been preset so as to be linked with a position.

Note that information about an authority of each person may be included in a printing job and may be in a state where the multifunctional machine 1 can use the information as information linked with a printing job.

Moreover, the job management section 45 includes a determination section 49 that determines which printing job is processed with high priority or the like.

For example, in a first mode, the determination section 49 stops processing of a first printing job under processing, processes a second printing job instructed from the second button, and resumes the processing of the first printing job after processing of the second printing job. In a second mode, the determination section 49 completes processing of the first printing job under processing without stopping the processing of the first printing job and performs processing of the second printing job instructed from the second button 62 after completion of the processing of the first printing job. In which mode the determination section 49 is to be operated may be input by the device operator using the display operation section 15 and may be set from the external information processing device 5.

In this embodiment, when the device operator information processing section 41 determines that, among the accumulated printing jobs, there is a printing job processing of which is required by a person with high authority whose authority is higher than that of the device operator, the job management section 45 adds a new printing job after the printing job of the person with high authority. Note that the job management section 45 may be configured to add a new printing job immediately after the printing job of the person with high authority.

As has been described above, the multifunctional machine 1 according to the first embodiment includes the display section 40 that displays the first button 61 that switches a screen to the setting screen via which a setting of printing is received and the second button 62 that causes printing to be immediately executed in accordance with a preset setting, the accumulation section 18 that accumulates a printing job, and the job management section 45 that manages the printing job accumulated by the accumulation section 18, and the job management section 45 adds the first job printing of which is instructed after the first button 61 has been pressed and the screen has been switched to the setting screen to an order after the printing jobs accumulated by the accumulation section 18 and adds the second job printing of which is instructed from the second button 62 to an order before the printing job accumulated by the accumulation section 18.

Thus, processing of a printing job corresponding to the immediate execution button can be executed before a printing job waiting to be processed, so that the printing job corresponding to the immediate execution button can be immediately processed.

The job management section 45 stops processing of the first job under processing, processes the second job, and resumes the stopped processing of the first job after processing of the second job.

Thus, when the device operator instructs immediate execution, print processing corresponding to the immediate execution is executed with highest priority, so that an effect that a comfortable work to the device operator is enabled can be achieved.

The job management section 45 determines based on a preset setting whether to stop processing of the first job under processing, process the second job, and resume, after processing of the second job, the processing of the first job, or to complete the processing of the first job under processing without stopping the processing of the first job and process the second job after completion of the processing of the first processing.

Thus, which the processing of the first job under processing and a job processing of which is instructed by immediate execution is to be executed with higher priority can be preset. Therefore, an effect that efficient job processing is enabled can be achieved.

The job management section 45 adds the second job as a job to be executed in an earliest processing order among jobs that the device operator is allowed to execute, with respect to the printing jobs accumulated by the accumulation section 18.

Thus, when there is a difference between an authority of an instructor who instructed processing of an accumulated printing job waiting to be processed and the authority of the device operator, a higher priority is given to one of the instructor and the device operator that has a higher authority. Therefore, considering the authorities, a printing job corresponding to the immediate execution button can be immediately processed.

The job management section 45 adds the second job as a job to be executed in an earliest processing order, with respect to the printing jobs accumulated by the accumulation section 18.

Thus, when the device operator instructs immediate execution, it is preset that a highest priority is given to printing processing corresponding to the immediate execution, and therefore, an effect that a comfortable work to the device operator is enabled can be achieved.

The program 19 causes a processor of the printing device including the display section that displays the first button 61 that switches the screen to the setting screen via which a setting of printing is received and the second button 62 that causes printing to be immediately executed in accordance with a preset setting and the accumulation section 18 that accumulates a printing job to function as the job management section 45 that manages the printing job accumulated by the accumulation section 18, and the job management section 45 adds the first job printing of which is instructed after the first button 61 has been pressed and the screen has been switched to the setting screen to an order after the printing job accumulated by the accumulation section 18 and adds the second job printing of which is instructed from the second button 62 to an order before the printing job accumulated by the accumulation section 18.

Thus, similar effects to the effects of the multifunctional machine 1 described above are exhibited.

A method for producing a printed material by a printing device includes displaying the first button 61 that switches the screen to the setting screen via which a setting of printing is received and the second button 62 that causes printing to be immediately executed in accordance with a preset setting, adding the first job printing of which is instructed after the first button 61 has been operated and the screen has been switched to the setting screen to an order after an accumulated printing job, adding the second job printing of which is instructed from the second button 62 to an order before the accumulated printing job, and printing the accumulated printing job, the first job, and the second job in a processing order to produce a printed material.

Thus, similar effects to the effects of the multifunctional machine 1 described above are exhibited. Furthermore, a printed material can be immediately produced with a desired setting.

The present disclosure is not limited to the above-described embodiments and, as a matter of course, various changes can be made without departing from the gist of the present disclosure.

For example, each of components illustrated in FIG. 3 and FIG. 6 is merely an example, and a specific implementation thereof is not particularly limited. That is, there is no need to mount a hardware individually corresponding to each component. As a matter of course, a configuration in which respective functions of the components are realized by executing programs by a plurality of processors can be employed. A portion of a function realized by a software in the above-described embodiments may be made as a hardware and, alternatively, a portion of a function realized by a hardware may be realized by a software. Besides the foregoing, a specific detailed configuration of each of other components of the multifunctional machine 1 can be arbitrarily modified without departing from the gist of the present disclosure.

In the above-described embodiments, as the "printing device," the multifunctional machine 1 has been described as an example. The "printing device" may be, for example, a printer that does not have a scanning function.

For example, an operation step unit illustrated in FIG. 5 is defined by dividing processing in accordance with major processing contents in order to facilitate understanding of an operation of each section of the multifunctional machine 1 and the present disclosure is not limited by how processing is divided into processing units or names of the processing units. Processing may be further divided into more step units in accordance with processing contents. Each step unit may be further divided so that further more process steps are included. An order of steps may be changed as appropriate in a range not hindering the gist of the present disclosure.

What is claimed is:

1. A printing device comprising:
   a display section that displays a first button that switches a screen to a setting screen via which a setting of printing is received and a second button that causes printing to be immediately executed in accordance with a preset setting;
   an accumulation section that accumulates a printing job; and
   a job management section that manages an accumulated printing job that has been accumulated by the accumulation section and causes printing based on the accumulated printing job to be executed in accordance with a processing order,
   wherein
   the job management section
      adds to the accumulation section a first printing job of which is instructed after the first button is pressed and the screen is switched to the setting screen, such that a processing order of the first printing job is after a processing order of the accumulated printing job that has been accumulated, and
      adds to the accumulation section a second printing job of which is instructed from the second button, such that a processing order of the second printing job is before the processing order of the accumulated printing job that has been accumulated.

2. The printing device according to claim 1, wherein
   the job management section stops processing of the first printing job under processing, processes the second printing job, and resumes, after processing of the second printing job, the stopped processing of the first printing job.

3. The printing device according to claim 2, wherein
   the job management section determines based on a preset setting whether
      to stop processing of the first printing job under processing, process the second printing job, and resume, after processing of the second printing job, the processing of the first printing job, or
      to complete the processing of the first printing job under processing without stopping the processing of the first printing job, process the second printing job, and resume, after processing of the second printing job, the processing of the first printing job.

4. The printing device according to claim 1, wherein
   the job management section adds the second printing job as a job to be processed in a processing order that is earliest among orders of printing jobs that a device operator is allowed to process and is later than orders of printing jobs that the device operator is not allowed to process, with respect to the accumulated printing jobs that have been accumulated.

5. The printing device according to claim 1, wherein
   the job management section adds the second printing job as a job to be processed in a processing order that is earliest among orders of the printing jobs, with respect to the accumulated printing jobs that have been accumulated.

6. A non-transitory computer-readable storage medium storing a program, the program causing a processor of a printing device including a display section that displays a first button that switches a screen to a setting screen via which a setting of printing is received and a second button that causes printing to be immediately executed in accordance with a preset setting and an accumulation section that accumulates a printing job to function as a job management section that manages an accumulated printing job that has been accumulated by the accumulation section, wherein
   the job management section
      adds to the accumulation section a first printing job of which is instructed after the first button is pressed and the screen is switched to the setting screen, such that a processing order of the first printing job is after a processing order of the accumulated printing job that has been accumulated, and
      adds to the accumulation section a second printing job of which is instructed from the second button, such that a processing order of the second printing job is before the accumulated printing job that has been accumulated.

7. A printing method comprising:
   accumulating a printing job in an accumulation section;
   switching a screen to a setting screen in accordance with an operation of a displayed first button to receive designation of a setting, and adding to the accumulation section a first job created based on the received setting such that a processing order of the first job is after an accumulated printing job that has been accumulated;
   adding to the accumulation section a second job created without switching the screen to the setting screen in accordance with an operation of a displayed second button, such that a processing order of the second job is before the accumulated printing job that has been accumulated; and
   printing the accumulated printing job, the first job, and the second job in a processing order.

* * * * *